(12) United States Patent
Gratzer et al.

(10) Patent No.: US 10,495,205 B2
(45) Date of Patent: Dec. 3, 2019

(54) BEARING ARRANGEMENT

(71) Applicant: Magna Powertrain GmbH & Co KG, Lannach (AT)

(72) Inventors: Franz Gratzer, Stallhofen (AT); Hannes Schweiger, Nestelbach bei Graz (AT); Wolfgang Schweiger, St. Stefan (AT); Simon Wurzinger, Bad Radkersburg (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

(21) Appl. No.: 14/907,667

(22) PCT Filed: Aug. 5, 2014

(86) PCT No.: PCT/EP2014/066841
§ 371 (c)(1),
(2) Date: Jan. 26, 2016

(87) PCT Pub. No.: WO2015/018838
PCT Pub. Date: Feb. 12, 2015

(65) Prior Publication Data
US 2016/0160984 A1 Jun. 9, 2016

(30) Foreign Application Priority Data

Aug. 8, 2013 (DE) .................. 10 2013 215 682

(51) Int. Cl.
*F16H 48/42* (2012.01)
*F16C 33/66* (2006.01)
(Continued)

(52) U.S. Cl.
CPC .......... *F16H 48/42* (2013.01); *F16C 19/381* (2013.01); *F16C 19/48* (2013.01); *F16C 19/545* (2013.01);
(Continued)

(58) Field of Classification Search
CPC ...... F16H 48/42; F16H 57/021; F16H 57/043; F16H 57/0471; F16H 2048/423;
(Continued)

(56) References Cited

U.S. PATENT DOCUMENTS 1,106,149 A * 8/1914 Loomis ................ F16C 19/545
475/230
1,536,824 A * 5/1925 Domizi ................ F16H 57/021
475/246
(Continued)

FOREIGN PATENT DOCUMENTS

DE 6808805 U 3/1969
DE 6808806 U 3/1969
(Continued)

OTHER PUBLICATIONS

International Search Report dated Sep. 16, 2014 in International PCT Application Serial No. PCT/EP2014/066841.
(Continued)

*Primary Examiner* — Zakaria Elahmadi
(74) *Attorney, Agent, or Firm* — Dickinson Wright PLLC

(57) ABSTRACT

A bearing arrangement for rotatably supporting a pinion shaft in a housing is described. A pinion of the pinion shaft interacting with a ring gear, the pinion shaft being mounted in the housing by way of two axial bearings and a radial bearing which is arranged between the axial bearings.

20 Claims, 3 Drawing Sheets

(51) Int. Cl.
  *F16C 19/38* (2006.01)
  *F16C 19/48* (2006.01)
  *F16C 19/54* (2006.01)
  *F16H 57/021* (2012.01)
  *F16H 57/04* (2010.01)

(52) U.S. Cl.
  CPC ...... *F16C 33/6659* (2013.01); *F16C 33/6677* (2013.01); *F16H 57/021* (2013.01); *F16H 57/043* (2013.01); *F16H 57/0471* (2013.01); *F16C 2361/61* (2013.01); *F16H 2048/423* (2013.01)

(58) Field of Classification Search
  CPC ...... F16C 19/381; F16C 19/48; F16C 19/545; F16C 33/6659; F16C 33/6677; F16C 2361/61
  See application file for complete search history.

(56) References Cited

U.S. PATENT DOCUMENTS

| | | | | |
|---|---|---|---|---|
| 1,884,657 A * | 10/1932 | Gerlinger | ............... | B61D 43/00 105/117 |
| 2,019,464 A * | 10/1935 | Riblet | ............... | F16C 19/381 384/563 |
| 2,347,352 A * | 4/1944 | Lapsley | ............... | F16H 3/22 74/15.2 |
| 2,383,954 A * | 9/1945 | Buckendale | ............... | F16C 19/381 384/618 |
| 2,514,262 A * | 7/1950 | Schmitter | ............... | F16H 3/145 74/379 |
| 2,871,726 A * | 2/1959 | Kamlukin | ............... | F16H 3/663 475/219 |
| 2,903,973 A * | 9/1959 | Lewis | ............... | B61D 43/00 105/131 |
| 3,256,852 A * | 6/1966 | Warburton, II | ............... | B63H 20/10 440/52 |
| 3,383,937 A * | 5/1968 | Toenne | ............... | F16C 19/548 184/11.1 |
| 3,394,610 A * | 7/1968 | Szodfridt | ............... | B60K 17/16 384/542 |
| 4,274,298 A * | 6/1981 | Ostrander | ............... | F16C 19/548 184/6.12 |
| 5,425,666 A * | 6/1995 | Frank | ............... | B24B 23/03 451/344 |
| 5,913,745 A * | 6/1999 | Inagaki | ............... | F16C 35/067 384/428 |
| 6,307,292 B1 * | 10/2001 | Brown | ............... | F16C 25/08 310/90 |
| 6,485,389 B1 * | 11/2002 | Bell | ............... | F16H 48/08 180/312 |
| 6,514,169 B2 * | 2/2003 | Turner | ............... | B60K 17/36 475/222 |
| 6,863,634 B2 * | 3/2005 | Holman | ............... | B60K 17/16 475/230 |
| 7,086,983 B2 * | 8/2006 | Turner | ............... | F16C 19/548 475/220 |
| 7,232,398 B2 * | 6/2007 | Garcia | ............... | B60B 35/08 29/401.1 |
| 7,258,641 B2 * | 8/2007 | Green | ............... | F16H 57/0483 475/160 |
| 7,306,536 B2 * | 12/2007 | Ziech | ............... | B60K 17/36 180/24.09 |
| 8,220,363 B2 * | 7/2012 | Bayer | ............... | F16H 1/14 74/606 R |
| 8,844,396 B2 * | 9/2014 | Myers | ............... | F16H 57/0424 184/11.2 |
| 8,845,198 B2 * | 9/2014 | Wolf | ............... | F16C 19/54 384/452 |
| 8,888,377 B2 * | 11/2014 | Claus | ............... | F16C 19/54 384/563 |
| 9,062,711 B2 * | 6/2015 | Hofmann | ............... | F16C 19/542 |
| 9,429,212 B2 * | 8/2016 | Grosswald | ............... | F16H 1/14 |
| 9,739,360 B2 * | 8/2017 | Bujold | ............... | F16H 48/08 |
| 2003/0089185 A1 * | 5/2003 | Hock | ............... | F16D 27/112 74/56 |
| 2003/0121345 A1 * | 7/2003 | Nett | ............... | F16H 1/222 74/416 |
| 2003/0140718 A1 * | 7/2003 | Nett | ............... | F16H 1/222 74/416 |
| 2005/0247528 A1 * | 11/2005 | Schack | ............... | F16D 55/226 188/72.8 |
| 2006/0040780 A1 * | 2/2006 | Tiesler | ............... | F16H 37/042 475/210 |
| 2006/0156842 A1 * | 7/2006 | Melber | ............... | F16H 1/14 74/423 |
| 2007/0066438 A1 * | 3/2007 | Gumpoldsberger | ... | B60K 17/16 475/230 |
| 2007/0173335 A1 * | 7/2007 | Engelmann | ............... | B60K 17/165 464/111 |
| 2008/0124014 A1 * | 5/2008 | Smook | ............... | F16C 35/067 384/428 |
| 2008/0285905 A1 * | 11/2008 | Kiyosawa | ............... | F16C 19/381 384/618 |
| 2010/0086248 A1 * | 4/2010 | Yamamoto | ............... | F16H 57/021 384/548 |
| 2010/0101351 A1 * | 4/2010 | Lafer | ............... | B60K 17/344 74/467 |
| 2010/0189388 A1 * | 7/2010 | Draser | ............... | F16C 19/381 384/563 |
| 2011/0045934 A1 * | 2/2011 | Biermann | ............... | F16H 48/10 475/252 |
| 2013/0053210 A1 * | 2/2013 | Kari | ............... | F16C 33/203 475/331 |
| 2014/0309072 A1 * | 10/2014 | Schimpf | ............... | F16H 48/38 475/220 |
| 2014/0329634 A1 * | 11/2014 | Biermann | ............... | F16H 48/11 475/220 |
| 2015/0053035 A1 * | 2/2015 | Tegeltija | ............... | F16H 57/021 74/423 |
| 2015/0369284 A1 * | 12/2015 | Hager | ............... | F16C 17/26 384/291 |
| 2016/0160990 A1 * | 6/2016 | Tegeltija | ............... | F16C 19/548 74/423 |
| 2016/0311320 A1 * | 10/2016 | Nilsson | ............... | B60K 17/35 |

FOREIGN PATENT DOCUMENTS

| | | | | |
|---|---|---|---|---|
| DE | 4115217 C2 | 10/1993 | | |
| DE | 102007062148 A1 | 6/2009 | | |
| DE | 102008050232 A1 | 4/2010 | | |
| DE | 102008059569 A1 | 6/2010 | | |
| DE | 102009057634 A1 | 6/2011 | | |
| DE | 102010019974 A1 | 11/2011 | | |
| DE | 102011006290 A1 | 10/2012 | | |
| DE | 102011079750 A1 | 1/2013 | | |
| EP | 1295749 A2 | 3/2003 | | |
| FR | 2349763 A1 | 11/1977 | | |
| JP | 06323329 A | * | 11/1994 | ............ F16C 19/545 |
| JP | H06323329 A | 11/1994 | | |
| JP | 2003172348 A | * | 6/2003 | ............ F16C 19/381 |
| JP | 2003172348 A | 6/2003 | | |

OTHER PUBLICATIONS

Search Report dated Mar. 2, 2018 in corresponding German Patent Application No. 102013218434.4.

* cited by examiner

BEARING ARRANGEMENT

CROSS-REFERENCE TO RELATED APPLICATIONS

This application is a U.S. National Stage of International Application No. PCT/EP2014/066841 filed Aug. 5, 2014 and which claims priority to German Application No. DE102013205682.0 filed Aug. 8, 2013. The entire disclosure of each of the above applications is incorporated herein by reference.

FIELD

The present disclosure relates to a bearing arrangement for a pinion shaft within a housing wherein the pinion shaft interacts with a crown gear, and wherein the pinion shaft is mounted in the housing by way of two axial bearings and a radial bearing arranged between the two axial bearings.

BACKGROUND

A pinion shaft which interacts with a ring gear of a differential has to absorb forces in the axial direction and transversely with respect to the axial direction. In addition, bending forces act on the pinion shaft.

EP 1 295 749 A2 has disclosed an axle drive with a ring gear and a pinion shaft in addition to a bearing arrangement via tapered roller bearings. The pinion shaft is supported in the housing radially and in the axial direction via two tapered roller bearings.

JP 2003-172348 A has disclosed a pinion shaft bearing arrangement by means of radial anti-friction bearings and an axial bearing.

SUMMARY

The basis of the present disclosure is the object of providing a bearing arrangement in a form which is improved in comparison with the known solutions.

This object is achieved by way of a bearing arrangement having the features of claim 1. Developments of the invention result from the subclaims.

According to the invention, a bearing arrangement of a pinion shaft is provided in a housing, such as a transmission housing, the pinion of a pinion shaft interacting with a ring gear, the toothing system of the ring gear, the pinion shaft being mounted in the housing, such as in a wall of the housing, by way of two axial bearings and a radial bearing which is arranged between the axial bearings.

The pinion shaft is guided through an opening in the wall of the housing into the interior of the housing. The ring gear is arranged within the housing and interacts with the pinion of the pinion shaft. The bearing arrangement according to the invention consists of in each case one axial bearing on both sides of the housing wall and a radial bearing, a radial bearing ring between the two axial bearings. The two axial bearings, the bearing rings surround the opening which guides the pinion shaft through on both sides of the housing. In the interior of the housing, the first axial bearing can be arranged between the pinion, the rear side of the pinion and a first side of the housing wall.

The second axial bearing which is arranged outside the housing is arranged between the housing, a second side of the housing wall and an axial support, in particular a thrust washer which is fixed by means of a securing ring.

Three bearing rings are provided according to one preferred embodiment of the invention. The axial bearings are arranged in the described way on the inner side and the outer side of the housing wall. The radial bearing is arranged within the opening of the housing and between the two axial bearings.

At least one of the axial bearings has a compensation element which is configured as a spring element, which acts between the bearing and the housing, and which serves to compensate for temperature expansions.

The radial bearing is preferably configured as a needle bearing. At least one of the axial bearings is also preferably configured as a needle bearing.

A further preferred embodiment of the invention provides a combination of a radial/axial bearing. A bearing combination of this type is preferably inserted from the transmission outer side and uses a bearing ring with a bearing face for the radial bearing and a bearing face for the second axial bearing which is seated on the outside.

For the supply with lubrication, it can be provided according to one preferred embodiment of the invention that that end of the pinion shaft which is seated in the interior of the housing is of hollow configuration, and the radial bearing is supplied with a radially running lubricating oil bore from the interior of the pinion shaft, that is to say with the oil within the transmission housing.

That end of the pinion shaft which is of hollow configuration and lies within the transmission housing can additionally have an oil catch ring which narrows the opening of the end of the pinion shaft and thus causes an oil quantity to be stored within the rotating pinion shaft.

The inner, first axial bearing is supplied with the lubricating oil which is situated within the housing. The outer, second axial bearing can be supplied with oil via a lubricating oil bore from the interior of the pinion shaft. As an alternative or in addition, a supply of lubricating oil takes place via the adjoining radial bearing. In addition to the lubricating oil bore in the pinion shaft, the radial bearing can obtain an oil supply via a bore in the housing.

Needle bearings are fundamentally stiffer than tapered roller bearing arrangements which are designed for combined loads and the raceways of which do not lie perpendicularly with respect to the load direction. A needle bearing fundamentally always absorbs loads perpendicularly with respect to the rolling body raceway. A higher bending moment can also be absorbed as a result of the enlarged bearing diameter in comparison with the conventional tapered roller bearing arrangement. The axial needle bearings can therefore transmit a high bending moment, relative to their load rating. Accordingly, the bearing base extends predominantly in the radial direction, which leads to an advantageous short axial overall length of the bearing arrangement. In the case of identical loading, reduced oblique positioning of the pinion shaft axis and a reduced deflection of the shaft ends are caused in comparison with a conventional tapered roller bearing arrangement. Although a reduction in the shaft deflection under operating load can be achieved in tapered roller bearings by way of an increase in the prestress, this in turn has disadvantageous effects with regard to the bearing friction.

The tensile and shear loads which act over a load spectrum are generally of different magnitude. This circumstance is taken into consideration in the bearing arrangement according to the invention by way of a corresponding adaptation of the axial needle bearing dimensions.

In one preferred embodiment, at least one axial needle bearing has an axial compensation element for the purpose of maintaining a temperature-independent bearing prestress. This is achieved by way of a spring element, the working region of which acts over the entire operating temperature range of the length change to be expected.

In a further preferred embodiment, that axial needle bearing which has to absorb the greater axial forces in the spectrum is configured as a friction-optimized bearing.

In a further preferred embodiment, that axial needle bearing which has to absorb the greater axial forces in the spectrum is configured as a low-noise bearing.

In a further preferred embodiment, a radial/axial needle bearing combination is used, consisting of a radial needle ring and an axial needle ring with bearing bush and integrated, hardened and honed raceways for the rolling bodies. Axial fixing of the needle sleeve by way of shoulders or circlips is dispensed with, as a result of which further potentials can be opened up with regard to overall length and system costs. This arrangement is particularly easy to assemble and is recommended, in particular, for application in light metal housings which have a lower stiffness in the region of the bearing points.

DRAWINGS

In the further text, exemplary embodiments of the invention are explained using the drawings. In the drawings:

FIG. 1b is a sectional view of the prior art bearing arrangement associated with the pinion shaft shown in FIG. 1a;

FIG. 2a is a sectional view showing a first embodiment of the present disclosure while FIG. 2b illustrates a perspective view of the arrangement shown in FIG. 2a; and FIG. 3a is a sectional view showing a second embodiment of the present disclosure while FIG. 3b illustrates a perspective view of the arrangement shown in FIG. 3a.

DETAILED DESCRIPTION

Figure 1A:
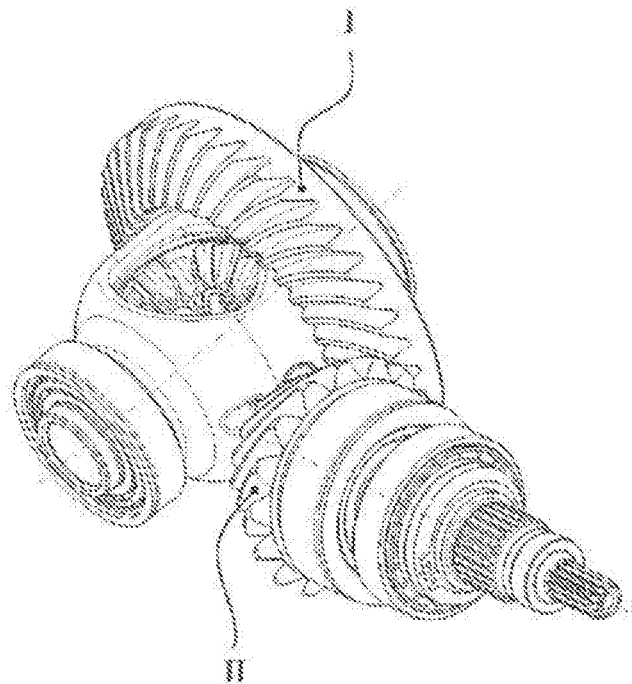
FIG. 1a is a perspective view of pinion gear of a pinion shaft interacting with a ring gear of a differential arranged in accordance with the prior art.
Figure 1B:
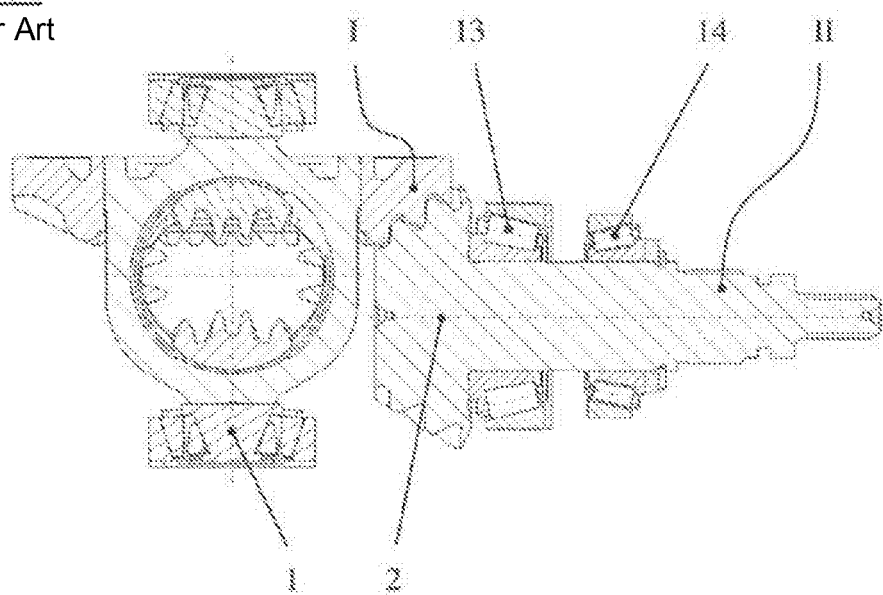

FIG. 1a shows a perspective illustration of a pinion of a pinion shaft II which interacts with a ring gear I of a differential. FIG. 1b shows a section through the arrangement according to FIG. 1a—a section in the plane which is formed by the axis 1 of the ring gear I and the axis 2 of the pinion shaft II. The bearing arrangement of the pinion shaft II which is shown and is configured according to the prior art consists of two tapered roller bearings 13, 14, the inner rings of which support the pinion shaft II and the outer rings of which are received in a housing (not shown), a transmission housing. The tapered roller bearing 13 is supported on the pinion, in particular the rear side of the pinion, and the second tapered roller bearing is supported on an axial locking washer of the pinion shaft II. The pinion, the pinion shaft II is supported in the axial direction and in directions perpendicular with respect thereto by way of the tapered roller bearings 13, 14. Here, the forces to be absorbed are produced by way of the toothing system.

Figure 2A:
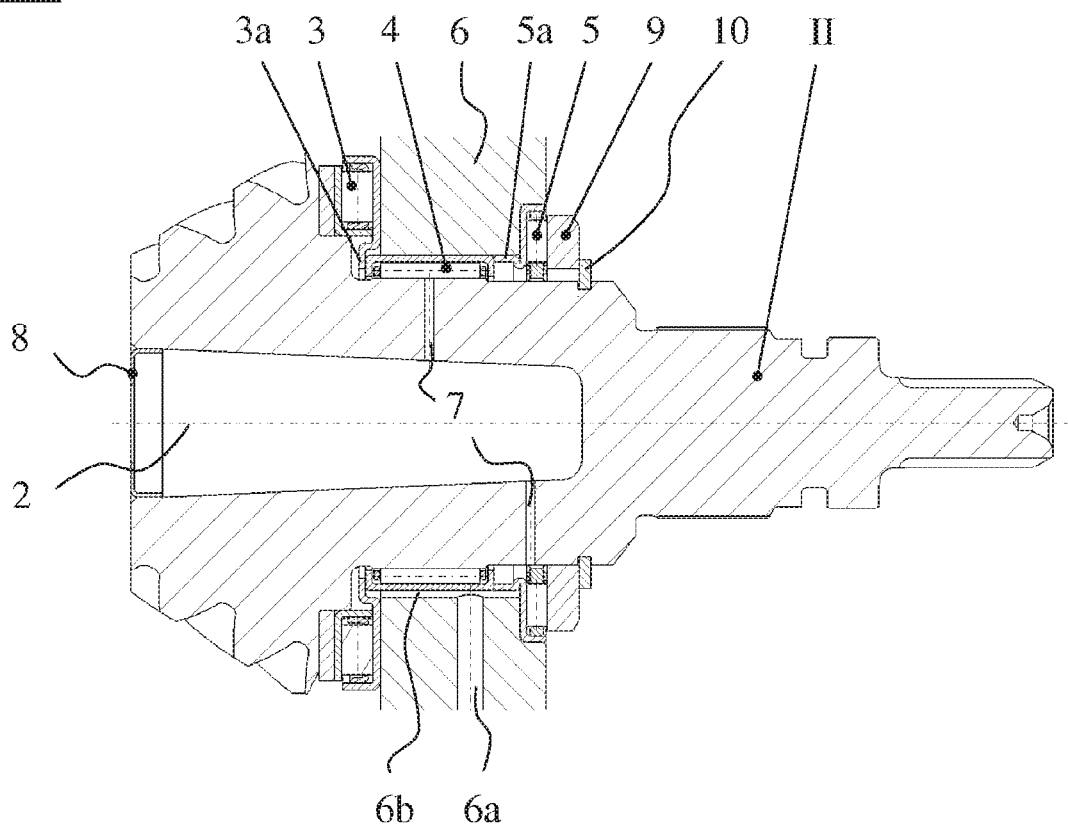

FIG. 2a shows a first refinement according to the invention in section, wherein the pinion shaft II is received in a wall of a transmission housing 6 both in the axial and radial direction via two axial bearings 3, 5 and a radial bearing 4 which is arranged between the axial bearings 3, 5.

The first axial bearing 3 is arranged between the rear side of the pinion and a first side of the wall of the transmission housing 6. The second axial bearing 5 is set into an annular notch formed in a second side of the wall of the transmission housing 6 and interacts with a thrust washer 9, the thrust washer 9 being supported axially on the pinion shaft II by way of a securing ring 10. The axial bearing 3 has to absorb the greater forces during operation and is therefore of greater dimensions.

A radial bearing 4, likewise configured as a needle bearing, is arranged between the two axial bearings 3, 5. On its left-hand side, the radial bearing 4 is supported on a bearing shoulder 3a of the first axial bearing 3, and on the right-hand side the radial bearing 4 is supported on a bearing shoulder 5a of the second axial bearing 5.

The radial bearing 4 supports the pinion shaft II in the radial direction in an aperture formed in the wall of the transmission housing 6. The lubrication of the radial bearing 4 takes place through a lubricating oil bore 7 which runs in the radial direction and via which oil can be conveyed from the interior of the pinion shaft II to the radial bearing 4. The pinion shaft II is of open configuration at its end which lies in the transmission housing 6, and the oil which is situated in the housing thus passes into said interior space of the pinion shaft II and via the radial lubricating oil bore 7 to the radial bearing 4. The pinion shaft II which is of partially hollow configuration is additionally provided with an oil catch ring 8, by means of which oil can be caught which is conveyed via the lubricating oil bore 7 in the direction of the radial bearing 4 using the centrifugal force.

The second axial bearing 5 which lies outside the transmission housing 6 is likewise supplied with oil from the interior space of the pinion shaft II via a second radial lubricating oil bore 7.

Figure 2B:
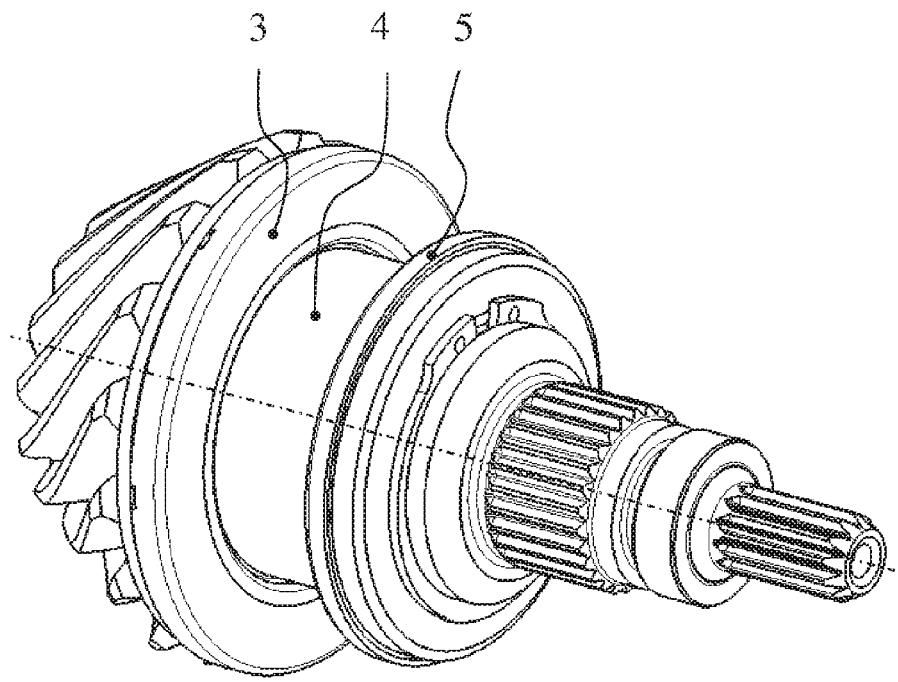

FIG. 2b shows the axial bearings 3, 5 and the radial bearing 4 on the pinion shaft II in a perspective view.

Figure 3A:
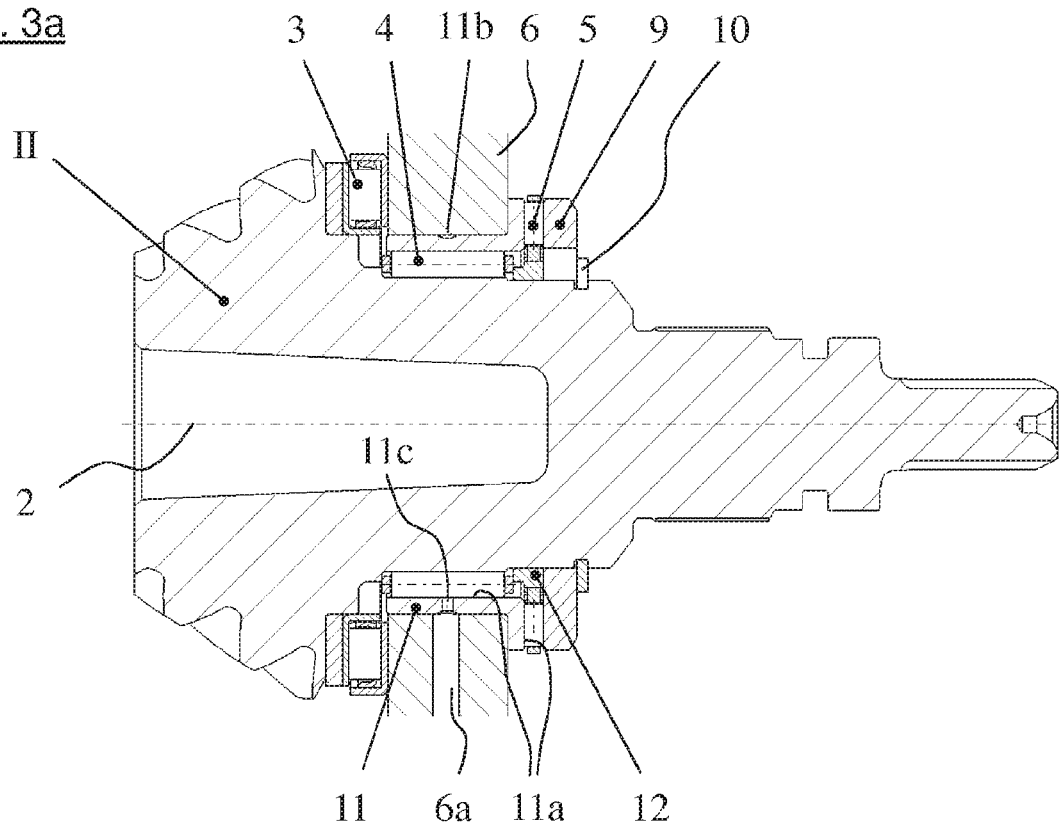

FIG. 3a shows a second embodiment of the invention, likewise in section through the pinion shaft II. A radial/axial needle bearing combination is provided, consisting of an axial bearing 3, a radial needle ring, a radial bearing 4 and an axial needle ring, a second axial bearing 5 with bearing bush 11 having integrated, hardened and honed raceways 11a for the rolling bodies of the radial bearing 4 and the axial bearing 5. A spacer and centering ring 12 serves for inner centering of the axial needle ring 5. This arrangement is recommended for use in light metal housings 6 which have a stiffness which is not sufficient in some circumstances in the region of the bearing points.

The feed of lubricating oil from the oil sump takes place via a central supply bore 6a from the oil sump through the transmission housing 6 and further via a circumferential lubricating oil groove 11b which is integrated in the bearing bush 11, and radial lubricating oil bores 11c. A central feed of lubricating oil to the rolling bodies in the radial bearing 4 is ensured as a result. The supply of lubricating oil to the axial bearings 3, 5 takes place in the return utilizing the action of centrifugal force. In addition and/or as an alternative, a lubricating oil supply as shown in the embodiment in FIG. 2a can take place via the pinion shaft II of hollow configuration and radially arranged lubricating oil bores 7 in FIG. 2a. FIG. 2a further discloses the feed of lubricating oil from the oil sump via the central supply bore 6a from the oil sump through the transmission housing 6 and further via a lubricating oil groove 6b formed in the wall of transmission housing 6.

Figure 3B:
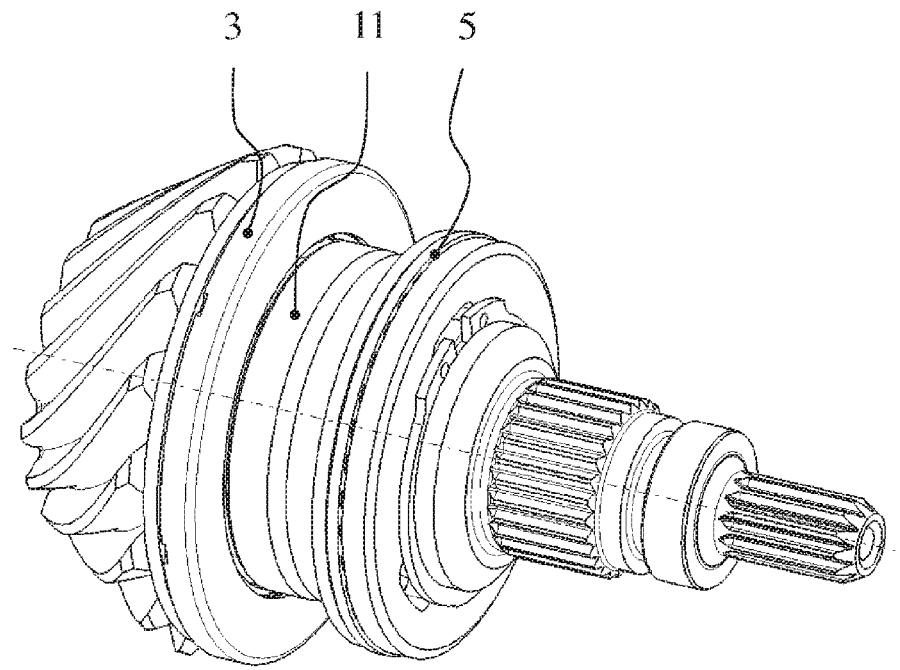

FIG. 3b shows the axial bearings 3, 5 and the bush 11 of the radial bearing 4 on the pinion shaft II in a perspective view.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as departure from the disclosure, and all such modifications are intended to be included within the scope of the disclosure.

LIST OF DESIGNATIONS

I Ring gear
II Pinion shaft
1 Rotational axis, ring gear
2 Rotational axis, pinion shaft
3 First axial bearing
3a Bearing shoulder, first axial bearing
4 Radial bearing
5 Second axial bearing
5a Bearing shoulder, second axial bearing
6 Transmission housing, wall, housing
6a Lubricating oil supply bore
6b Axial lubricating oil groove
7 Radial lubricating oil bore
8 Oil catch ring
9 Thrust washer
10 Securing ring
11 Bush
11a Raceway
11b Lubricating oil annular groove
11c Radial lubricating oil bore
12 Spacer and centering ring
13 Tapered roller bearing
14 Tapered roller bearing

The invention claimed is:

1. A pinion shaft and bearing assembly for being rotatably supported in a housing comprising:
a pinion shaft including a shaft segment extending along an axis and including a pinion extending radially outwardly from the shaft segment, the pinion having a front side having gear teeth for interacting with a ring gear, and a rear side opposite the front side and in radial alignment with the gear teeth;
a first axial bearing positioned axially adjacent to the rear side of the pinion for axially supporting a first side of a wall of the housing relative to the pinion while allowing rotation of the pinion relative to the wall of the housing;
a second axial bearing positioned in axially spaced relationship with the first axial bearing for axially supporting a second side of the wall of the housing while allowing rotation of the pinion shaft relative to the wall of the housing; and
a radial bearing positioned axially between the first and second axial bearings and radially against the shaft segment of the pinion shaft for radially supporting the wall of the housing while allowing rotation of the pinion shaft relative to the wall of the housing;
wherein the pinion shaft and bearing assembly includes only a single radial bearing and two axial bearings.

2. The pinion shaft and bearing assembly as claimed in claim 1, wherein the first axial bearing is fixed axially relative to the pinion.

3. The pinion shaft and bearing assembly as claimed in claim 1, wherein at least one of the first and second axial bearings is a needle bearing.

4. The pinion shaft and bearing assembly as claimed in claim 1, wherein the radial bearing is a needle bearing.

5. The pinion shaft and bearing assembly as claimed in claim 1, wherein a spring element axially biases at least one of the first and second axial bearings toward the other of the first and second axial bearings in order to compensate for thermal expansions.

6. The pinion shaft and bearing assembly as claimed in claim 1, wherein at least one of the first and second axial bearings forms a structural unit with the radial bearing.

7. The pinion shaft and bearing assembly as claimed in claim 1, wherein the radial bearing is supplied with oil via an oil lubricating bore formed in the pinion shaft.

8. The pinion shaft and bearing assembly as claimed in claim 1, wherein the radial needle bearing is supplied with oil via an oil lubricating bore in the pinion shaft.

9. The pinion shaft and bearing assembly as claimed in claim 1, wherein the pinion shaft has a hollow configuration at the end which protrudes into the housing.

10. A pinion shaft and bearing assembly, comprising:
a housing positioned about an axis and extending axially between a first sidewall and a second sidewall opposite the first sidewall and defining an interior extending along the axis;
a pinion shaft including a shaft segment positioned in the interior of the housing and extending along an axis and having a pinion positioned axially outside of the interior of the housing and extending radially outwardly from the shaft segment, the pinion having a front side having gear teeth adapted to mesh with a ring gear, and a rear side opposite the front side and in radial alignment with the gear teeth;
a first axial bearing positioned axially outside of the interior of the housing and axially against the rear side of the pinion and axially against the first sidewall of the housing for axially supporting the first sidewall of the housing relative to the pinion while allowing rotation of the pinion relative to the first sidewall of the housing;
a second axial bearing positioned in axially spaced relationship with the first axial bearing and axially supporting the second sidewall of the housing relative to the pinion shaft while allowing rotation of the pinion shaft relative to the second sidewall of the housing; and
a first radial bearing positioned axially between the first and second axial bearings and radially against the shaft segment of the pinion shaft and radially supporting the housing while allowing rotation of the pinion shaft relative to the housing.

11. The pinion shaft and bearing assembly as claimed in claim 10, wherein the radial bearing is arranged in the interior of the housing radially between the pinion shaft and the housing.

12. The pinion shaft and bearing assembly as claimed in claim 11, wherein the radial bearing has a first end supported on a first bearing shoulder extending from the first axial bearing and a second end supported on a second bearing shoulder extending from the second axial bearing.

13. The pinion shaft and bearing assembly as claimed in claim 11, wherein a bearing bush having a tubular portion is mounted in the interior of the housing and a radial portion engaging the second sidewall of the housing, wherein the radial needle bearing is disposed between the tubular portion of the bearing bush and the pinion shaft, and wherein the second axial bearing is disposed between the radial portion of the bearing bush and the thrust washer.

14. The pinion shaft and bearing assembly as claimed in claim 13, wherein the radial bearing is supplied with oil via an oil lubricating bore formed in the wall of the housing, a circumferential groove formed in the tubular portion of the bearing bush, and a radial bore communicating with the circumferential groove.

15. The pinion shaft and bearing assembly as claimed in claim 10, wherein a spacer ring is disposed between the pinion shaft and each of the first and second axial bearings and the first radial bearing.

16. A pinion shaft and bearing assembly, comprising:
a housing positioned about an axis and extending axially between a first sidewall and a second sidewall opposite the first sidewall and defining an interior extending along the axis;
a pinion shaft including a shaft segment positioned in the interior of the housing and extending along the axis and having a pinion positioned axially outside of the interior of the housing and extending radially outwardly from the shaft segment, the pinion having a front side having gear teeth adapted to mesh with a ring gear, and a rear side opposite the front side and in radial alignment with the gear teeth; and
a first axial needle bearing axially outside of the interior of the housing and axially against the rear side of the pinion and axially against the first sidewall of the housing for axially supporting the first sidewall of the housing relative to the rear side of the pinion while allowing rotation of the pinion relative to the housing, a second axial needle bearing axially against the second sidewall of the housing and axially against a thrust washer for axially supporting the second sidewall of the housing relative to the thrust washer while allowing rotation of the pinion relative to the thrust washer, the thrust washer secured axially against a securing ring on an opposite side of the thrust washer as the second axial bearing, and a radial needle bearing arranged radially against the shaft segment and axially between the first and second axial needle bearings for radially supporting the housing relative to the pinion shaft while allowing rotation of the pinion shaft relative to the housing;
wherein the pinion shaft and bearing assembly includes only a single radial needle bearing and two axial needle bearings.

17. The pinion shaft and bearing assembly as claimed in claim 10, wherein the first and second axial bearings and the first radial bearing are needle bearings.

18. The pinion shaft and bearing assembly as claimed in claim 10 wherein the radial bearing extends across at least a majority of an axial length between the first and second axial bearings.

19. The pinion shaft and bearing assembly as claimed in claim 1 wherein the radial bearing extends across at least a majority of an axial length between the first and second axial bearings.

20. The pinion shaft and bearing assembly as claimed in claim 16 wherein the radial needle bearing extends across at least a majority of an axial length between the first and second axial needle bearings.

* * * * *